United States Patent [19]
Vinayagamoorthy et al.

[11] Patent Number: 6,140,110
[45] Date of Patent: Oct. 31, 2000

[54] APPARATUS FOR MULTI-ZONE POLYMERASE CHAIN REACTION

[76] Inventors: Thuraiayah Vinayagamoorthy, #112-245 Still water Dr., Chalsea Gardens, Saskatoon, Canada, S7J 4M7; Roger Grant Hodkinson, 10925-80th Avenue, Edmonton, AB, Canada, T6G 0P9

[21] Appl. No.: 09/220,143

[22] Filed: Dec. 23, 1998

Related U.S. Application Data

[62] Division of application No. 09/035,091, Mar. 5, 1998, Pat. No. 5,912,129.

[51] Int. Cl.$^7$ .............................. C12M 1/00; C12Q 1/68; G01N 33/53; C12P 19/34; C07H 21/04
[52] U.S. Cl. ..................... 435/285.1; 435/6; 435/91.1; 435/91.2; 536/23.1; 536/24.3; 536/24.33
[58] Field of Search ............................ 435/6, 91.1, 91.2, 435/283.1, 285.1, 286.2; 536/23.1, 24.3, 24.33

[56] References Cited

U.S. PATENT DOCUMENTS

| | | |
|---|---|---|
| 5,333,675 | 8/1994 | Mullis et al. . |
| 5,364,591 | 11/1994 | Green et al. . |
| 5,863,502 | 1/1999 | Southgate . |
| 5,912,129 | 6/1999 | Vinayagamoorthy et al. . |
| 5,985,651 | 11/1999 | Hunicke-Smith ..................... 435/285.1 |

FOREIGN PATENT DOCUMENTS

| | | |
|---|---|---|
| 0 325 763 | 8/1989 | European Pat. Off. . |
| 2 650 657 | 2/1991 | France . |
| WO 93/25912 | 12/1993 | WIPO . |
| WO 94/26414 | 11/1994 | WIPO . |
| WO 97/27324 | 7/1997 | WIPO . |
| WO 97/47767 | 12/1997 | WIPO . |
| WO 99/15622 | 4/1999 | WIPO . |

*Primary Examiner*—Kenneth R. Horlick
*Assistant Examiner*—Jeffrey Siew

[57] ABSTRACT

A process of amplifying a nucleic acid sequence by a procedure involving a polymerase chain reaction or a ligase chain reaction. The process involves repeated cycles of steps including a nucleic acid denaturing step and a nucleic acid synthesis step, the synthesis step being carried out under the action of an enzyme (a nucleic acid polymerase or ligase). The denaturing step and the synthesis step are carried out in different denaturing and synthesis reaction zones, respectively, and, during the repeated cycles, the enzyme is maintained in isolation from the denaturing reaction zone, and conditions or reagents required for the denaturing step are maintained in isolation from the synthesis reaction zone to the extent that the reagents and conditions required for denaturing do not impede the synthesis reaction to a substantial extent. The use of separate zones for the steps of the reactions means that an enzyme that is destroyed or degraded by the reagents and conditions required for denaturing (e.g. a thermolabile or alkalolabile polymerase or ligase) may be used in the reaction. Moreover, the use of multiple zones means that inexpensive equipment may be used for the process.

9 Claims, 9 Drawing Sheets

APPARATUS FOR MULTI-ZONE POLYMERASE CHAIN REACTION

CROSS-REFERENCE TO RELATED APPLICATIONS

This application is a Divisional of our prior application Ser. No. 09/035,091 filed Mar. 5, 1998, now U.S. Pat. No. 5,912,129.

BACKGROUND OF THE INVENTION

I. Field of the Invention

This invention relates to techniques used for the polymerization and amplification of sequences of nucleic acids of prokaryotic and eukaryotic origin involving the polymerase chain reaction or the ligase chain reaction. More particularly, the invention relates to a process and apparatus for carrying out such techniques.

II. Background Art

The amplification of nucleic acid sequences by means of a chain reaction technique using a nucleic acid polymerase enzyme has been developed over the last several years to enable minute amounts of nucleic acids, e.g. DNA, to be copied in quantity to an extent suitable for detection and analysis. The procedure is described, for example, in U.S. Pat. Nos. 4,683,195, 4,683,202, 5,436,149, 5,405,774, 5,340,728, 5,338,671 and 4,965,188, the disclosures of which are incorporated herein by reference. Recently, a related chain reaction technique involving a nucleic acid ligase enzyme has also been developed.

The polymerase chain reaction (PCR) procedure is briefly explained as follows. In nature, the replication of duplex DNA is carried out by the key enzyme DNA polymerase that has two activities, namely:

a) 5'-3' polymerase activity, i.e. the addition of new nucleotides to the growing strand at the 3-prime end of a primer, probe (labeled primer) or synthesizing strand; and b) 3'-5' exonuclease activity, i.e. the removal of nucleotides from the 3-prime end which may be misincorporated into the synthesizing strand.

The enzyme can be used for artificial replication of DNA by employing four basic elements:

a) A single stranded DNA or RNA template.

b) An oligonucleotide (primer or probe) having a nucleotide at the 3'-prime end carrying a hydroxy group at the 3rd position of the sugar molecule and carrying a base molecule which is complementary to the corresponding base molecule on the single stranded template strand.

c) A set of synthetic nucleotides (dTTP, dCTP, dGTP, dATP) activated by magnesium ions at pH 8.3–pH 8.4.

d) A DNA polymerase enzyme which has the ability to add new nucleotides at the 3-prime end of the primer (or to the growing chain) via phosphodiester bonds.

Given the fact that DNA occurs naturally as two complementary strands joined by hydrogen bonds, and that both strands of DNA may function as templates for the synthesis of new strands by polymerization, it is possible to duplicate a specific segment of DNA by using a pair of complementary oligonucleotides as primers which can bind across (i.e. on opposite sides of) the segment of interest (the so-called target sequence). It is known that, to facilitate the binding of primers to the template, the hydrogen bonds across the double stranded DNA first have to be broken and the single strands have to be separated. Conventionally, this is carried out by heating the template to a temperature greater than 94° C. and, when the sample cools, allowing the oligonucleotide primers to bind to (anneal with) complementary regions on the template. This is followed by the polymerase reaction which causes new double stranded DNA to be formed by nucleotide polymerization using the target sequence as a template for the selection of nucleotides for the new complementary sequence. The polymerase chain reaction extends this concept by making more copies of the target sequence by repeating the sequence of steps by cycling the temperature around the denaturing point while maintaining the reactants in a single chamber or reaction zone. Since normal DNA polymerase is heat sensitive (i.e. thermolabile), and is deactivated if heated to the temperature required for the separation of strands of DNA, it was initially necessary to add an influx of fresh polymerase prior to the synthesis step for each cycle. To overcome this limitation, a heat stable polymerase was isolated from *Thermophilus acquaricus*. Recently, the gene for thermostable polymerase has been cloned in expression vectors, and a recombinant heat stable enzyme produced and made commercially available.

The most common heat stable enzyme of this type is referred to as Taq DNA polymerase from *Thermophilus acquaticus*, but others are also known, e.g. Tth DNA polymerase from *Thermophilus thermophiles* and Tth DNA polymerase from *Thermophilus flavus*. The existence of such enzymes makes it possible to combine the starting materials and reactants in a single reaction zone or chamber and to cycle the temperature above and below 94° C. to produce the steps required for PCR without further additions of polymerase.

Thus, at present, the polymerase chain reaction in its most common form has three stages. They are:

a) Denaturing—Denaturing is a process whereby the individual strands of the DNA are separated by breaking the hydrogen bonds across the bases of the complementary nucleotides. At present, this is normally achieved by heating the DNA to near the boiling point of water (more specifically, to a "melting" temperature greater than 94° C.).

b) Annealing—This is a process whereby synthetic oligonucleotide primers or probes (each normally containing about 20 nucleotides) bind to complementary sequences of any single DNA strand present by the formation of hydrogen bonds across the bases of the complementary nucleotides. Pairs of primers are generally used, one for each strand of the DNA, flanking a sequence of interest, normally about 100 to 5,000 base pairs (bp) in length. The temperature at which annealing takes place is normally 37° to 70° C.

c) Polymerization—This involves the addition of new nucleotides at the 3'-prime end of the primer by the formation of phosphodiester bonds in the presence of Taq DNA polymerase. The polymerization reaction normally takes place at a temperature of about 72° C.

When this cycle is repeated many times (normally at least 30 times with each cycle typically lasting from 3 to 5 minutes), a detectable amount of the target DNA is produced.

The ligase chain reaction (LCR) is similar to PCR, except that short stretches of nucleic acid (probes), bound to a target sequence template, are joined together by a nucleic acid ligase enzyme. LCR is often used to distinguish between normal DNA of known sequence and mutant DNA. A pair of DNA probes having a sequence which, taken together, are complementary to the expected target nucleic acid are produced and brought into contact with the target sequence in the presence of a nucleic acid ligase enzyme. If double stranded target DNA is denatured and allowed to anneal with the probes, the probes will bind to the target DNA with ends adjacent to each other. The ligase enzyme then binds the probe DNA to form a single strand comprising both probes. If the target DNA differs from the expected sequence, the probes will not bind properly and the ligase enzyme will not be able to form the combined single strand. Repeated cycles amplify the combined single strand (if formed) which can be distinguished from the probes themselves by nucleotide length and by the presence of markers from both probes. If one of the probes is bound to a solid support and the other is not, the combined single strand will also be bound to the solid support and, after washing to remove the unbound probe, the presence of the combined strand can be detected by the presence of the marker used for the unbound probe. As in the case of PCR, LCR is carried out by repeated thermal cycles to cause denaturing and annealing of the DNA, so a thermostable ligase enzyme is required.

In spite of the feasibility of PCR and LCR, the widespread use of these techniques has been limited somewhat by the high capital cost of the required thermocycler apparatus, which tends to be complex in design and construction, and the high cost of the available thermostable polymerases or ligases. Therefore, current PCR technology often necessitates centralized testing at sites which are often distant from the point of sampling. This arrangement not only increases the cost but also delays the reporting of results. It would therefore be desirable to provide a PCR method and apparatus that could be used less expensively and made more widely available.

SUMMARY OF THE INVENTION

An object of the invention is to make PCR and/or LCR testing and synthesis less expensive and more readily available to researchers, medical personnel, manufacturers, and other potential users of the technology.

Another object of the invention is to enable PCR and LCR techniques to be carried out in a practical manner using relatively inexpensive polymerase and ligase enzymes.

Another object of the invention is to provide a PCR or LCR method that is not reliant on thermostable enzymes and that can be carried out in fairly simple apparatus that can be provided at or close to the source of sampling or use of the DNA.

Yet another object of the invention is to simplify apparatus used for carrying out nucleic acid amplification by the polymerase chain reaction or the ligase chain reaction.

According to a first aspect of the present invention, there is provided a process of amplifying a nucleic acid sequence by a procedure selected from the group consisting of a polymerase chain reaction and a ligase chain reaction, involving repeated cycles of steps including a nucleic acid denaturing step and a nucleic acid synthesis step, said synthesis step being carried out under the action of an enzyme, wherein the denaturing step and the synthesis step are carried out in different denaturing and synthesis reaction zones, respectively, and wherein, during said repeated cycles, the enzyme is maintained in isolation from the denaturing reaction zone, and conditions or reagents required for the denaturing step are maintained in isolation from the synthesis reaction zone to the extent that said reactions and conditions do not impede said synthesis reaction substantially. According to a second aspect of the invention, there is provided an apparatus for carrying out the above process, the apparatus comprising a container for reactants required during said denaturing step, a container for reactants required during said synthesis step, including said enzyme, a solid phase support for binding nucleic acid formed during said synthesis step, and means for separately and successively contacting said solid support with said reactants required during said denaturing step and said reactants required during said synthesis step.

According to a third aspect of the invention, there is provided a cassette unit for carrying out a process involving amplifying a nucleic acid sequence by a procedure selected from the group consisting of a polymerase chain reaction and a ligase chain reaction, involving repeated cycles of steps including a nucleic acid denaturing step and a nucleic acid synthesis step, said synthesis step being carried out under action of an enzyme, wherein the denaturing step and the synthesis step are carried out in different denaturing and synthesis reaction zones, respectively, and wherein, during said repeated cycles, the enzyme is maintained in isolation from the denaturing reaction zone, and conditions or reagents required for the denaturing step are maintained in isolation from the synthesis reaction zone to the extent that said reactions and conditions do not impede said synthesis reaction substantially; said cassette unit comprising an enclosed housing having at least two chambers for holding liquid reactants and maintaining said liquid reactants separate from each other and a solid support for nucleic acid provided in one said container, said housing including at least one passage allowing said solid support to be brought successively and temporarily into contact with said liquid reactants from said at least two containers.

By the term "reaction zone" as used herein we mean a region of reactants and conditions that result in a desired reaction (denaturing, synthesis, etc.). The regions forming the denaturing zone and the synthesis zone may be separated by distance (e.g. they may be located in different containers) or simply by time (e.g. the zones may be physically located in the same container but the reactants and conditions may vary over time to bring about different reactions).

By isolating the polymerase or ligase enzyme (hereinafter simply the "polymerase" or the "ligase") from the conditions or reactants required in the denaturing zone, an enzyme that is destroyed or deactivated by those reactants or conditions may be employed in the invention. Furthermore, by substantially isolating the conditions or reagents required for the denaturing zone from the synthesis zone, synthesis may proceed without any tendency of the newly-forming nucleotide polymer to separate from the template sequence. The nucleotide sequences are therefore cycled between the denaturing zone and the synthesis zone while other reagents and conditions required in those zones are kept in isolation from each other.

The conditions or reagents required for the denaturing step may be elevated temperature (above 94° C.) or aqueous alkali, although any other method of denaturing double stranded DNA may be used.

The polymerase or ligase used in the present invention is preferably a thermolabile (heat sensitive) enzyme because such enzymes are usually far less expensive than thermostable (heat tolerant) enzymes. The present invention makes it possible to use a thermolabile polymerase or ligase even if elevated temperature is used to bring about the denaturing step, since the enzyme is not exposed to the elevated temperature. However, a thermostable enzyme may alternatively be used in the present application if an inexpensive enzyme of this type can be found, or if the expense of the enzyme is acceptable to the user. Even when an expensive thermostable polymerase or ligase is used, the present invention has the advantage that the reaction can be carried out in simple and inexpensive apparatus.

Suitable thermolabile polymerases for use in the present invention include the following:

DNA polymerase 1 *E. coli* lambda lysogen NM 864;

DNA polymerase 1 Large Klenow fragment which lacks 5'-3' exonuclease activity;

AMV reverse transcriptase;

Murine reverse transcriptase;

M-MLV (Moloney murine Leukemia virus) reverse transcriptase expressed in *E. coli* as pol gene;

SP6 RNA polymerase;

T3 RNA polymerase;

T7 RNA polymerase;

T4 DNA polymerase; and

T7 DNA polymerase.

The above enzymes are all commercially available (e.g. from Life Technologies, Gaithersburg, Md., USA; and Amersham Life Science Inc., Canada). Of course, other polymerase enzymes may be employed, including chimeric recombinant enzymes carrying a polymerase moiety.

Examples of thermostable polymerases have been mentioned above.

Suitable thermolabile ligases include the following:

*E. coli* DNA ligase,

T4 DNA ligase, and

T4 RNA ligase.

The above ligases are commecially available, for example, from Boehringer Mannheim, Canada.

Examples of thermostable ligases include the following:

recombinant pfu DNA ligase from *Pyrococcus furiosus*.

The above ligase is commercially available from Stratagene, USA.

When the denaturing step is brought about by subjecting the double stranded DNA to aqueous alkaline conditions, i.e. by elevating the pH of the DNA-containing solution in the denaturing zone, elevated temperatures can be avoided. Most conventional polymerases and ligases are destroyed or deactivated by exposure to alkali, so again the present invention makes it possible to use a conventional inexpensive polymerase or ligase in the process since the enzyme is isolated from the denaturing conditions. In practice, however, it is preferable to use an alkali-resistant (alkalophilic) polymerase or ligase because some small amounts of the alkali may be carried over from the denaturing step to the synthesis (polymerization/ligation) step together with the denatured DNA. However, the amount of alkali carried over in this way must not be enough to interfere to any significant extent with the polymerization/ligation reaction, so there is still substantial isolation of the alkali from the polymerization/ligation zone despite some minor carry over.

Alkali tolerant polymerases and ligases may be obtained from alkali-tolerant microorganisms as disclosed, for example, in Alkalophilic Microorganisms, by Koki Horikoshi and Teruhiko Akiba, Japan Scientific Press, Tokyo, 1982, the disclosure of which is incorporated herein by reference. Examples of such alkali tolerant microorganisms include the following:

Bacteria: *Bacillus subtilis*

Blue green algae: *Plectonema nostocorum Arthrospira plantenesis*

Fungi: *Penicillium variables Fusarium bullatum Fusarium oxysporium.*

A known alkali-tolerant RNA polymerase suitable for use in the invention is obtained from *Bacillus subtilis*, and has an operable pH range of 7.0–9.3 with a maximum activity at pH 8.0.

The polymerase/ligase may be isolated from the denaturing step in any suitable way and the conditions or reagents required for the denaturing step may be isolated from the polymerization/ligation zone in any suitable way. This requires separating the polymerase/ligase from the newly formed double stranded DNA so that the DNA may proceed to the denaturing zone, and then removing the newly formed single stranded DNA from the denaturing zone so that it may proceed to the synthesis (polymerization/ligation) zone.

Most conveniently, the nucleic acid and/or the primers and/or the probes are immobilized on a solid support and the solid support is then successively and temporarily contacted with reagents and conditions that are appropriate for each step of the process, thus establishing different reaction zones. The immobilized nucleic acid can be easily and quickly contacted with and then removed from liquid reactants or regions of elevated temperature, i.e. from one reaction zone to another, so that the PCR or LCR cycles may be carried out rapidly and conveniently. Thus, the solid support may be movable and may be immersed successively into different reaction containers holding the required reagents and providing the required conditions of temperature or alkalinity, or alternatively the solid may be fixed and held in a single container and the required reagents for each step successively and temporarily introduced into the container and the appropriate conditions (e.g. temperature) applied. Thus, the nucleic acid can be separated from the polymerase/ligase after the polymerization/ligation reaction, prior to the denaturing reaction of the next cycle, and then the single stranded nucleic acid produced by the denaturing reaction can be contacted with the reactants and polymerase/ligase prior to the next polymerization/ligation reaction.

In a preferred form, the invention provides a process of amplifying a nucleic acid sequence, including repeated cycles of the steps of denaturing of complementary strands of nucleic acid, annealing of said nucleic acid with complementary primers flanking a target sequence, and DNA polymerase catalyzed polymerization of a sequence of nucleic acid complementary to said target sequence extending from said primers using the target sequence as a template, which process comprises: providing separate reaction zones having conditions appropriate for each of said denaturing, annealing and polymerization steps, and exposing said nucleic acid and synthesized nucleic acid sequences repeatedly to said reaction zones in an order and with residence times in each zone appropriate for effecting a polymerase chain reaction, wherein said reaction zone for said synthesis step contains a thermolabile DNA polymerase and has a temperature suitable for polymerization of nucleic acids that remains below a temperature at which activity of said polymerase is adversely affected.

Thus, the original and synthesized nucleic acid may be passed repeatedly through the reaction zones by immobilizing the nucleic acid on a solid, but easily-transportable support acting as a transport medium and moving the solid support from one reaction zone to another. The solid support may be, for example, a magnetic substrate (preferably in the form of beads) coated with anti-DNA antibody, or a type of paper that may bind DNA directly. When the solid transport medium is magnetic, the solid support medium may be moved through the zones by causing the transport medium to follow movements of a magnetic element (introduced directly into the zones or positioned immediately outside a container enclosing the reaction zones).

According to another preferred form of the invention, there is provided an apparatus for amplifying a nucleic acid sequence by a process involving repeated cycles of denaturing double stranded nucleic acid to form separated single strands, annealing the single strands of nucleic acid with at least one complementary primer or probe flanking a target sequence, and, using the target sequence as a template extending from the primers or probe, forming a complementary sequence of nucleic acids by nucleic acid polymerization in the presence of a nucleic acid polymerase enzyme to form double stranded nucleic acid, said apparatus comprising a container for reactants required during said denaturing step, a container for reactants required during said polymerization step, including said nucleic acid polymerase enzyme, a solid phase support for binding nucleic acid formed during said polymerization step, and means for separately and successively contacting said solid support with said reactants required for during said denaturing step and said reactants required during said polymerization step.

According to a further preferred form of the invention, there is provided apparatus for carrying out a process of amplifying a nucleic acid sequence, involving repeated cycles of the steps of denaturing of complementary strands of nucleic acid, annealing of said nucleic acid with complementary primers flanking a target sequence, and DNA polymerase catalyzed polymerization of a sequence of nucleic acid complementary to said target sequence extending from said primers using the target sequence as a template polymerization, said apparatus comprising: a plurality of containers for containing liquids forming reaction zones for denaturing, annealing and polymerization of nucleic acids, a solid support for immobilizing said nucleic acid and synthesized nucleic acid, and means for moving said solid support from one container to another in a sequence appropriate for effecting a polymerase chain reaction, wherein at least a container provided for said synthesis step is provided with means to prevent a temperature in said container from reaching a temperature at which activity of thermolabile DNA polymerase held in said container is destroyed.

In the present invention, the original nucleotide sequence intended for amplification may be, for example, genomic DNA, DNA/RNA duplexes or cDNA. The method is also applicable to asymmetric amplification using either single stranded DNA or RNA as a template (a process carried out to obtain sufficient copies of a single stranded nucleic acid sample for nucleotide sequencing or appropriate testing). The invention is also applicable to methods of detection or confirmation based on LCR.

This technology has application in the following areas:
a) Identification of microbial pathogens.
b) Identification of mutations and hereditary diseases.
c) Quantification of gene expression in cells.
d) DNA sequencing.
e) RNA sequencing.

The advantages over the conventional amplification using thermostable polymerase/ligase are:
a) There is no need for an expensive thermocycler (the apparatus conventionally used for the PCR/LCR procedure) and therefore the required capital cost is less. This may make the equipment sufficiently cost effective that the process may carried out in a decentralized testing facility (such as doctors' offices).
b) The apparatus may be designed to hold one or more removable housings (referred to herein as cassettes) each enclosing multiple containers for the various steps of the PCR/LCR method. When multiple cassettes are used, it is possible to carry out two or more PCR/LCR reactions on different substrates simultaneously, e.g. to analyze more than one type of sample at any one time on the same equipment using different cassettes, e.g. *E. coli* and Salmonella. Such cassettes may be produced as disposable units that may be kept sealed and provided with sealable inlets/outlets.
c) The number of samples analyzed at any one time can be varied. The equipment may have capacity to deal with:
1–5 samples at a time
1–10 samples at a time
1–25 samples at a time
1–50 samples at a time
1–100 samples at a time
1–200 samples at a time, or continuous feeding of cassettes.

The invention is described in more detail below with reference to the accompanying drawings.

DETAILED DESCRIPTION OF THE PREFERRED EMBODIMENTS

The present invention operates in essentially the same way for LCR and for PCR, i.e. by repeated denaturing, annealing and synthesis of nucleic acid. There are various alternative procedures for each type of technique. The alternatives available for PCR are shown in the flow chart of FIG. 1. The alternatives available for LCR are shown in the flow chart of FIG. 2.

Figure 1:
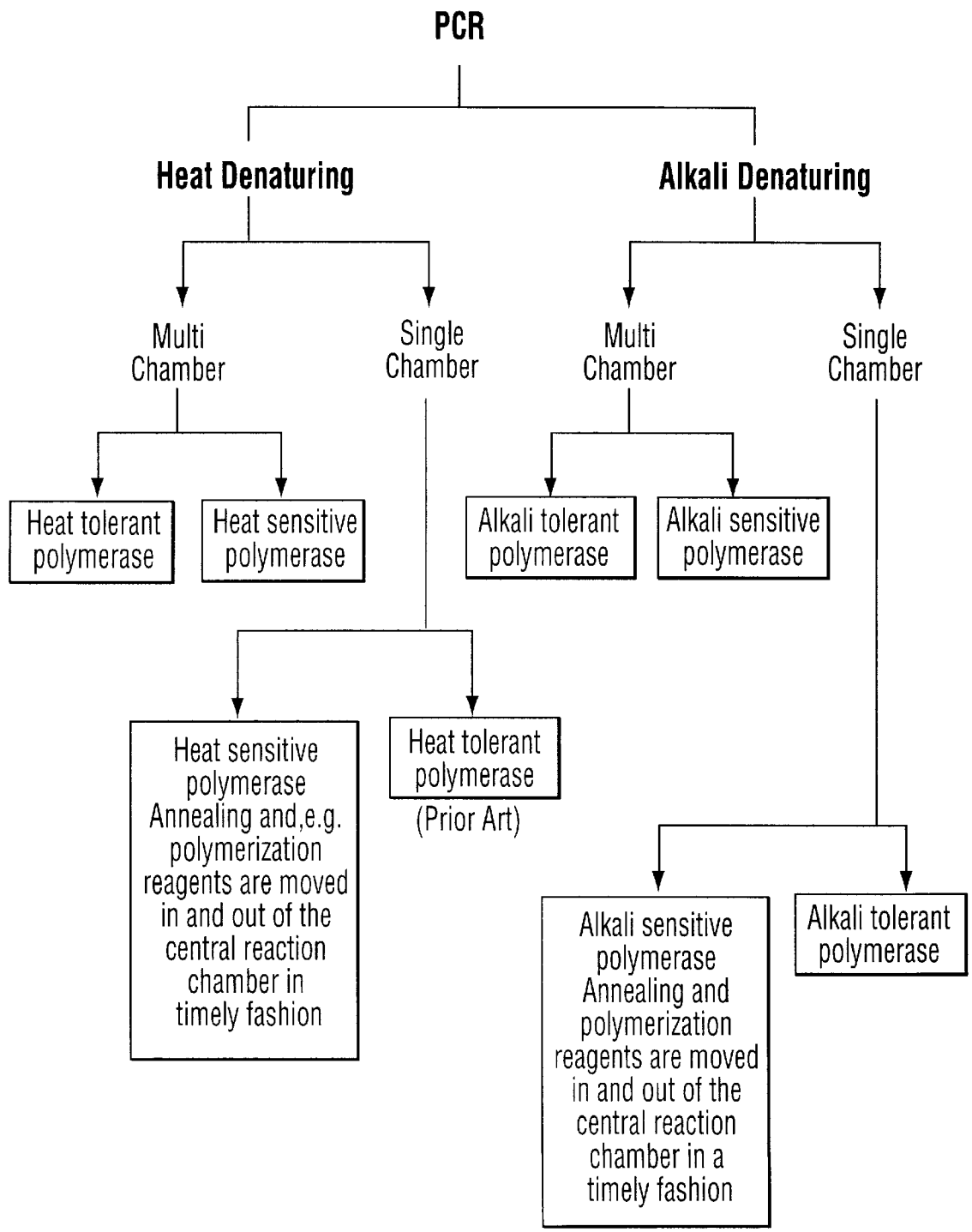
FIG. 1 is a flow chart illustrating the various alternative PCR procedures of the present invention and, in one case, the prior art.

Referring first to FIG. 1, following the illustrated flow chart from top to bottom, it will be apparent that the denaturing of the DNA may be carried out either by heat or by the use of alkali. In either case, the procedure may be carried out either in a single container (by binding the DNA in place and successively forming different reaction zones around the DNA at different times) or in multiple containers (the DNA is moved successively from one container to another, each container forming a different reaction zone). When heat is used to cause denaturing of the DNA in a multiple chamber technique according to the present invention, the polymerase enzyme may be either heat tolerant (thermostable) or heat sensitive (thermolabile). In both cases, the polymerase is isolated from the heat-denaturing step. In the case of a single chamber heat-denaturing technique, the conventional procedure (prior art) employs a heat tolerant polymerase and exposes the polymerase to the heat-denaturing step, whereas the present invention employs a heat sensitive polymerase and isolates the polymerase from the heat denaturing step.

In the case of alkali denaturing, again there is a choice of a multiple chamber or single chamber technique. In the case of the single chamber technique, an alkali tolerant polymerase may be employed, in which case there is no need to isolate the polymerase from the denaturing step (although this may still be desirable). Alternatively, an alkali sensitive polymerase may be used by isolating the polymerase from the denaturing step. In the case of a multiple chamber technique, again the polymerase may be alkali-sensitive or alkali-tolerant. In both cases, steps are taken to isolate the polymerase from the denaturing step.

Figure 2:
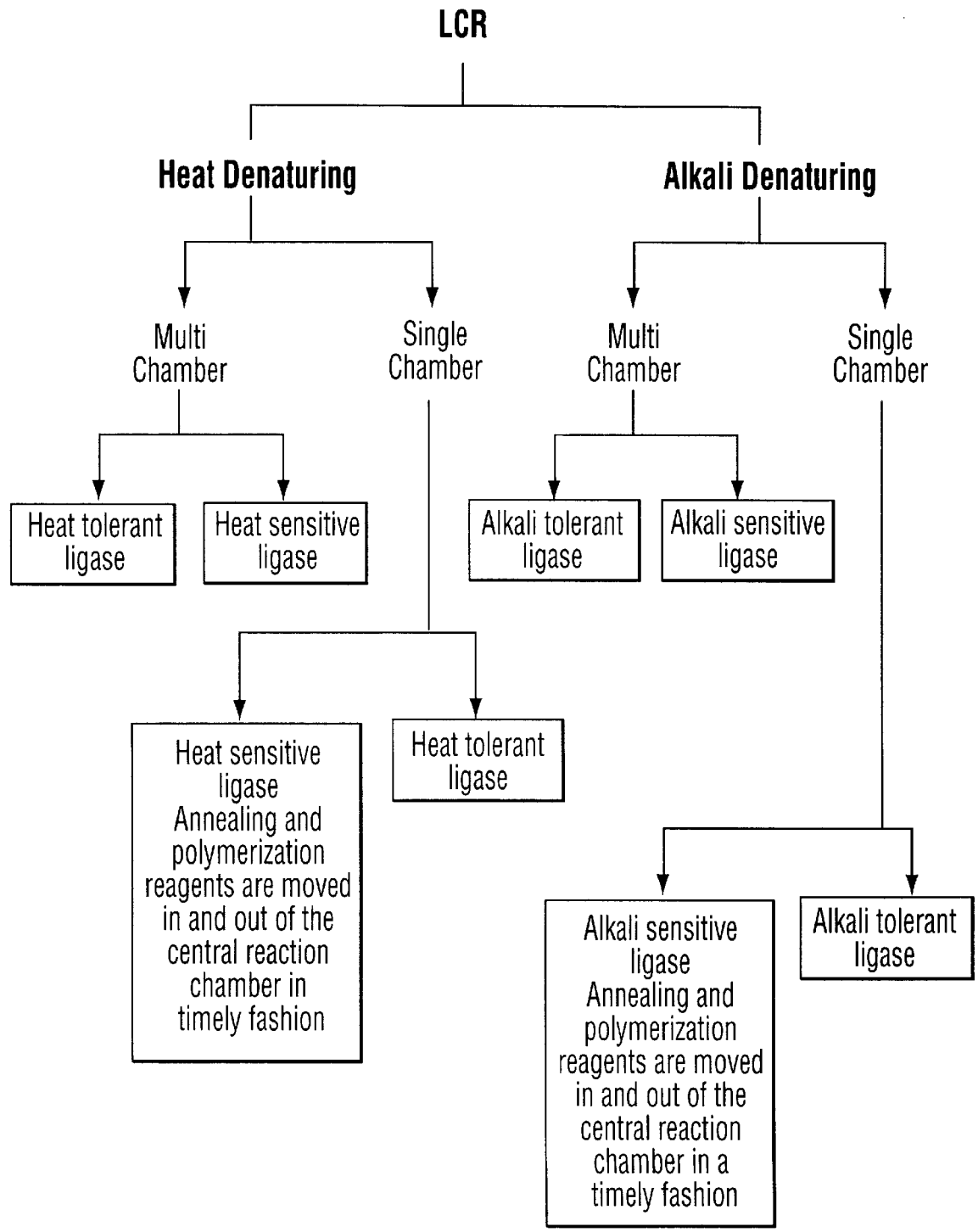
FIG. 2 is a flow chart similar to FIG. 1 illustrating the various LCR procedures of the present invention and, in one case, the prior art.

The alternatives shown for LCR in FIG. 2 are essentially the same, and the figure is believed to be self-explanatory. The following discussion focusses on PCR as an example, but may be applied in equivalent ways to LCR.

In preferred forms of the present invention, as it relates to PCR, the basic alternative procedures involving denaturing by heat or by alkali are outlined as follows:

a) The double stranded DNA is denatured by heat (at a temperature greater than 94° C.) in an aqueous medium in a first zone, then the denatured DNA is preferably moved to a second zone of lower temperature (less than about 50° C.) for annealing in a separate container, and then the annealed DNA and primers are finally moved to a polymerization zone where the thermolabile polymerase enzyme is present. The newly formed double stranded DNA is then returned to the denaturing zone and the process repeated.

b) The DNA is denatured in an alkaline medium in a first zone, then the DNA is preferably moved to a second zone for annealing at neutral pH and specific ionic concentrations, and then the annealed DNA and primers are moved to the polymerization zone where the polymerase is present. The newly formed double stranded DNA is then returned to the denaturing zone and the process repeated.

Of course, when it is stated that nucleic acid is moved from one zone to another, it should be understood that this movement is "relative", i.e. it may be achieved by maintaining the nucleic acid stationary and forming different zones around the nucleic acid at different times, as well as by moving the nucleic acid from one zone to another formed in different containers or chambers.

Figure 3:
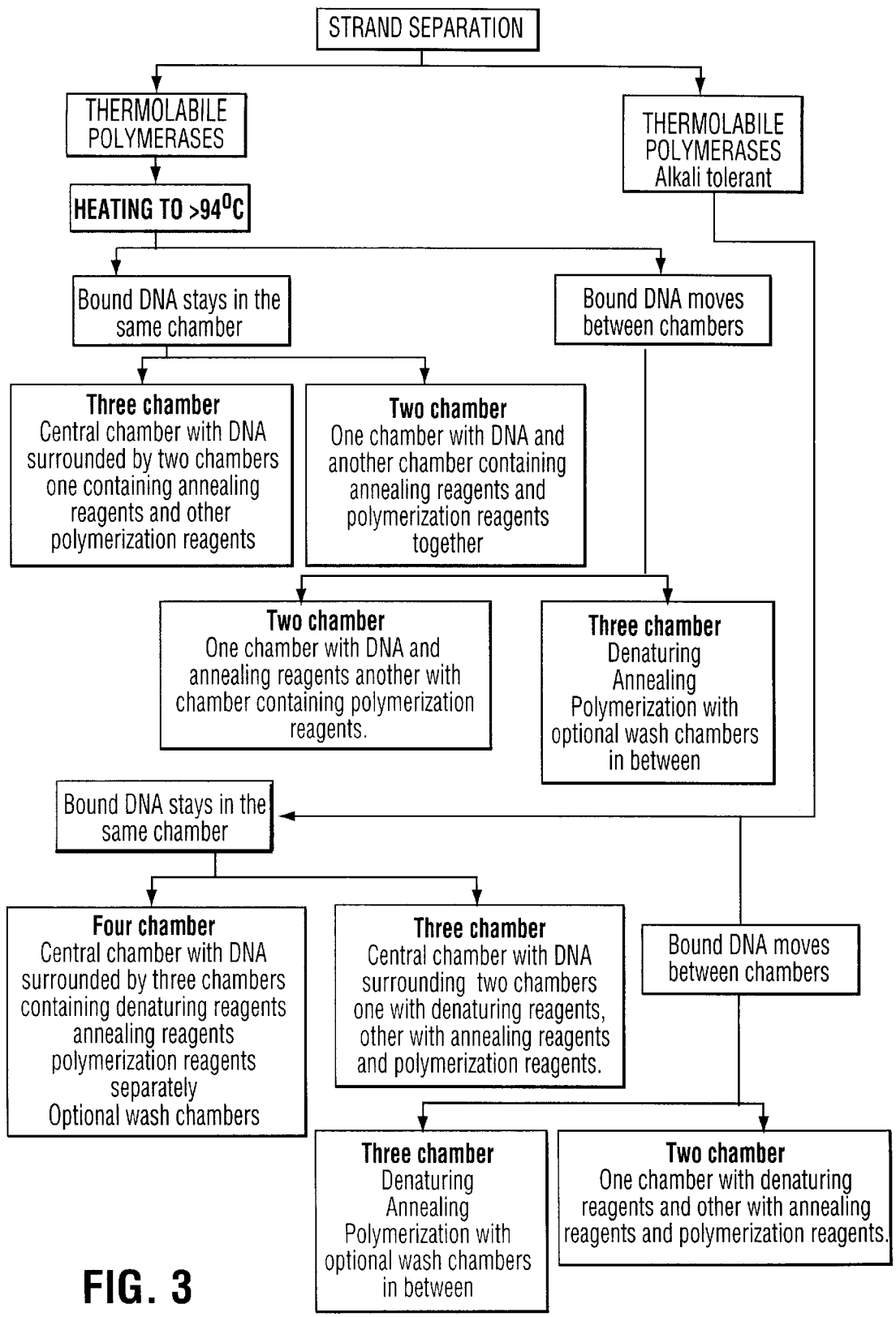
FIG. 3 is a further flow chart illustrating a PCR procedure in more detail.

In either type of process, there must be at least two reaction zones or solutions, one for the denaturing step and the other for the polymerization (synthesis) step. The annealing step is generally carried out in a separate reaction zone, but may alternatively be incorporated into the denaturing zone or the polymerization zone, according to the particular type of reaction scheme involved. In some cases, particularly when alkaline denaturing is employed, it may be desirable to provide four zones or solutions to allow for a separate washing step between the denaturing step and the annealing step. These various possibilities, for both temperature-based denaturing and alkali-based denaturing, are outlined in detail in the general flow chart of FIG. 3, which is believed to be self-explanatory.

Both these procedures (temperature denaturing and alkali denaturing) may be carried out by conjugating (attaching) the original sample DNA template (or the oligomer primers) to a suitable solid phase support that can act as a transport medium for moving the nucleic acid between reaction zones, or as an anchoring medium around which reaction zones can be formed successively with time. The solid support may be, for example, either an anti-DNA antibody-coated solid or a special paper-type matrix capable of directly binding the DNA, e.g. HY-BOND™ nylon paper. Other materials that may be used as solid supports include nitrocellulose paper, glass milk, particles coated with DNA binding proteins, DEAE-Sephadel™, DEAE-Sephadex™, DEAE-cellulose and polystyrene. Use may also be made of the biotin/streptavidin binding effect.

When the solid support is to be used as a transport medium, i.e. it is to be used to move the nucleic acid from one container to another, it is preferably produced in the form of magnetic particles having surface properties suitable for binding the nucleic acid. By employing a magnetic particulate solid, the support and immobilized nucleic acid may be transported by attracting the support to a magnet and moving the magnet to cause the solid to follow the magnet. Since magnetic attraction is not prevented by interposing thin walls between the magnet and the attracted solid, the magnet may be positioned outside a container containing the solid. The solid can therefore be moved within the container without having to introduce any transport means into the container itself.

Figure 4:
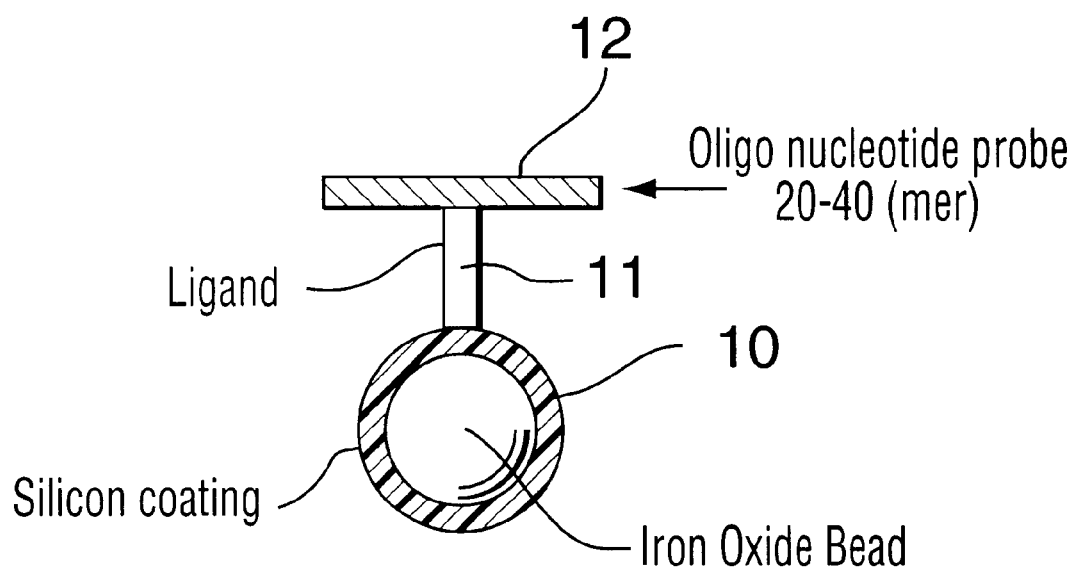
FIG. 4 shows an example of a magnetic particle of the type that may be used as a transport medium in the process of the present invention.

Magnetic beads are presently the preferred transport medium. Such beads may be made of any magnetisable material, e.g. iron oxide (note: although the beads are described herein as "magnetic", the beads need not themselves act as magnets—they merely need to be susceptible to magnet attraction). The beads are preferably spherical and may preferably vary in size from about 0.5 microns to 1.5 microns. However, the diameters of the beads may be increased to 1 mm or more so that movement of the beads from one zone to another may be made more convenient and reliable. An example of a magnetic bead suitable for use in the present invention is shown in FIG. 4. The bead 10 in this embodiment is a siliconized iron oxide particle attached by a ligand 11 to an oligomer (e.g. 40 mer) probe 12. The ligand 11 (e.g. an amino conjugate or a carboxy conjugate) may be any organic compound that binds to or may be conjugated to the bead. Alternatively, the siliconized iron oxide particle may be coated with streptavidin which will conjugate with biotinylated DNA. As a further alternative, the siliconized iron oxide particle may be coated with anti-DNA antibody (raised against purified DNA as well as native DNA) so that DNA binds to the antibody and hence to the particle. Similar binding methods may be used for other solid phase substrates.

Figure 5:
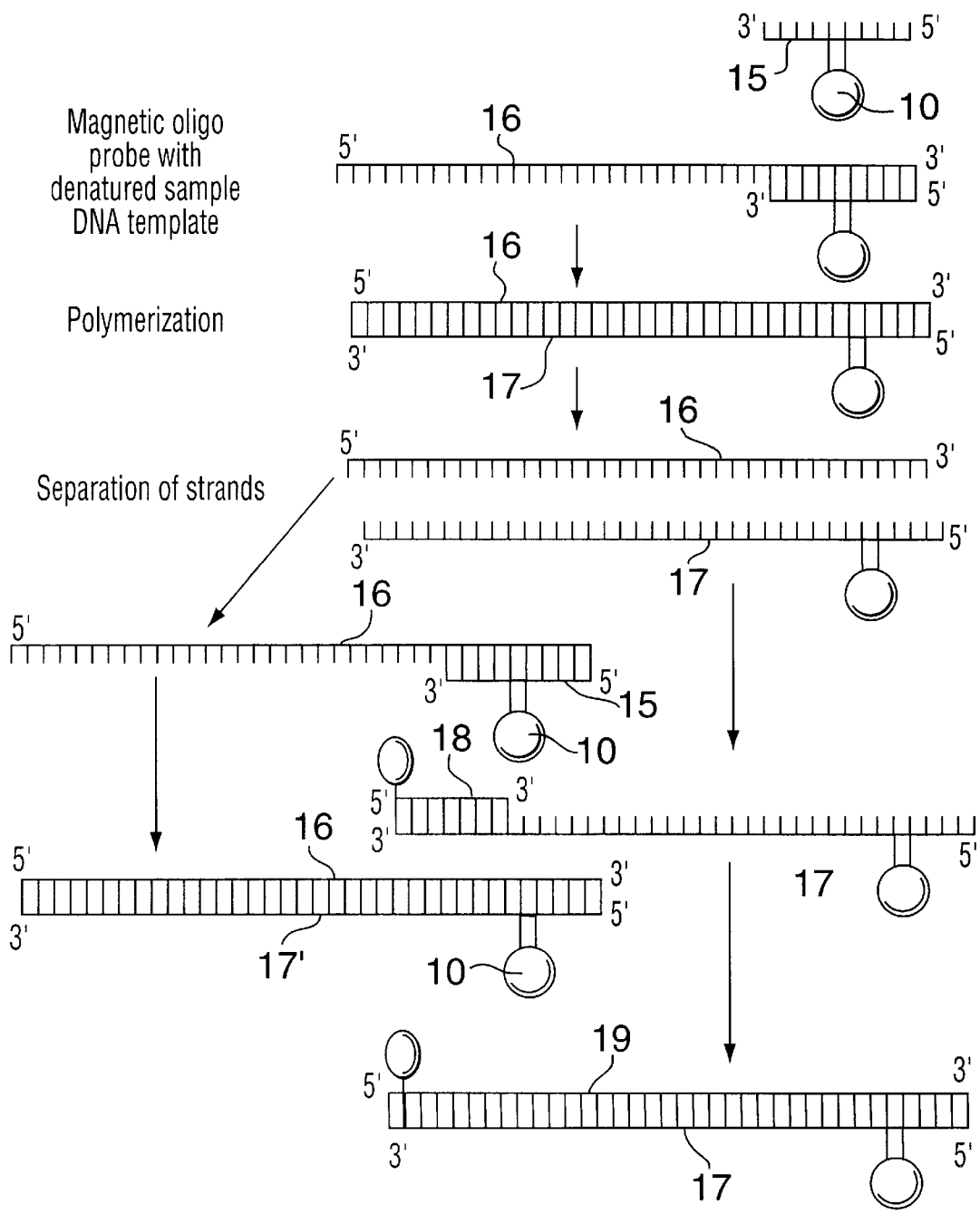
FIG. 5 is a diagram showing the scheme of a single primer polymerase chain reaction according to a preferred embodiment of the invention.

FIG. 5 illustrates how the process of the invention, employing a bead of the type shown in FIG. 4, can be used for single primer polymerase chain reaction. In this case, an oligomer primer 15 is attached to a magnetic bead 10. The primer is then annealed with a denatured sample 16 of a DNA template and polymerization is carried out in the presence of a thermolabile polymerase to form an extended DNA strand 17. In a further denaturing step, the extended strand 17 is separated from the DNA template strand 16. During further cycles, the template strand 16 goes on to create another amplified strand 17' in the same way during further cycles and the extended strand 17 anneals to a labelled oligomer primer (probe) 18, which is extended into a labelled extended strand 19 upon polymerization. This results in a considerable amplification of labelled target DNA strands suitable for sequencing or analysis.

Figure 6A:
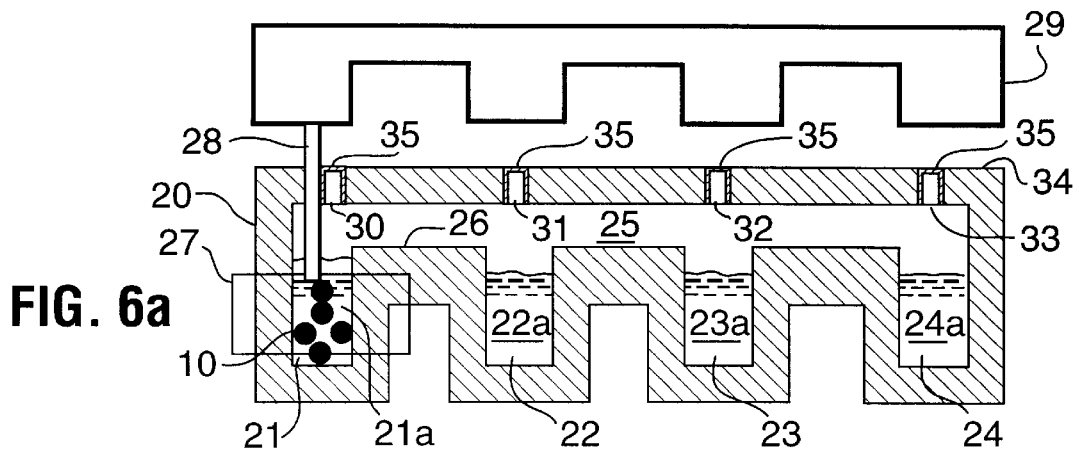
FIGS. 6*a*, 6*b*, 6*c* and 6*d* are diagrammatic representations of a preferred form of the process and apparatus of the present invention during various steps of the process.

FIGS. 6a–6d show an example of a preferred apparatus for carrying out the process of the invention using alkaline denaturing, at various stages in the process. As shown in FIG. 6a, the apparatus comprises a housing 20 enclosing four chambers 21, 22, 23 and 24 forming reaction containers capable of enclosing reaction zones. The lower parts of the chambers are not in fluid communication with each other, although the containers share a common head space 25 above the normal upper level of contained liquids forming a passage that allows the access to each chamber for reasons that will become apparent. Each chamber contains a liquid 21a, 22a, 23a and 24a suitable for carrying out a step in the process. Chamber 21 is for the step of denaturing double stranded DNA in alkaline conditions. Chamber 22 is a neutralising chamber containing an aqueous liquid for neutralising alkali carried over from chamber 21. This chamber is also preferably provided with a temperature control device (not shown, but see FIG. 7) to maintain the liquid in the chamber above the annealing temperature of the DNA. Chamber 23 is an annealing chamber containing a solution of primers. This chamber is also provided with a temperature control device (not shown) that causes the liquid in the chamber to fall below the annealing temperature of the DNA, thus allowing annealing to take place. Chamber 24 is provided for the polymerization reaction and holds a liquid containing a nucleic acid polymerase that is preferably alkali-tolerant. Again, this chamber may be provided with a heat control device that ensures that the temperature of the liquid is suitable for polymerization but does not rise above a maximum temperature at which the polymerase remains active.

FIG. 6a shows a number of magnetic beads 10, preferably of the type shown in FIG. 4, held within chamber 21. These beads are capable of binding and immobilizing DNA held within the chamber 21. The single stranded DNA formed during the denaturing step (caused by the alkaline conditions) is thus immobilized on the surface of the beads 10.

Figure 6B:
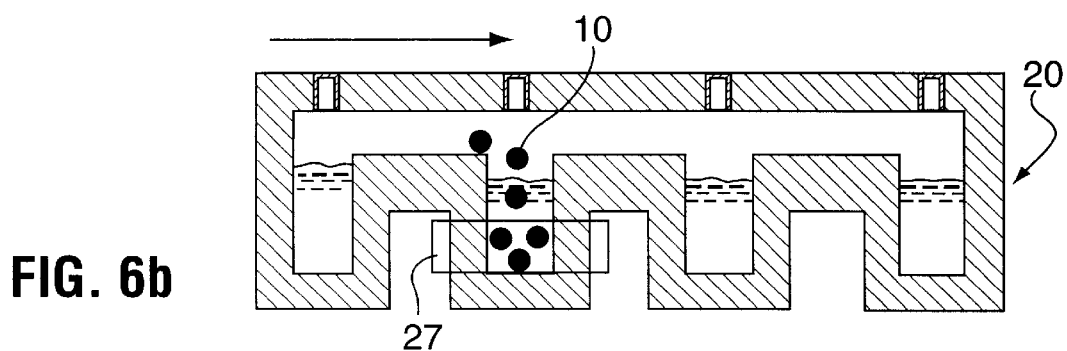
Figure 6C:
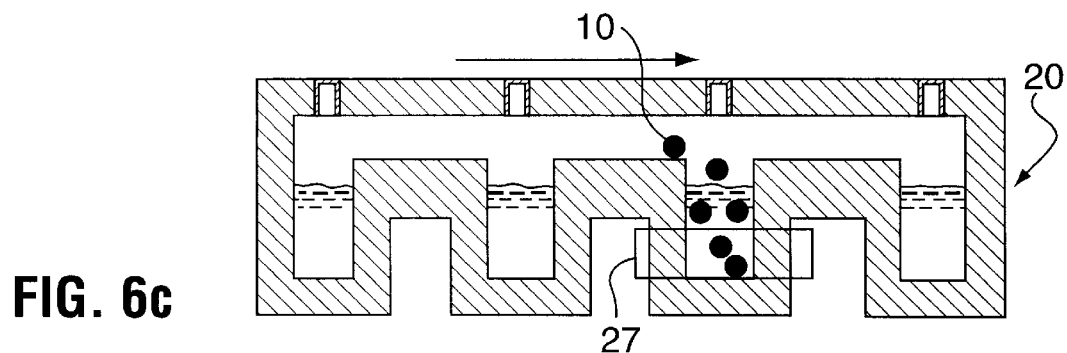

As shown in FIG. 6b, after the annealing step in chamber 21 is complete (after a few minutes), the beads 10 are transferred from chamber 21 to the neutralizing solution of chamber 22. This is achieved by moving a magnet 27 along an outside wall of the housing 20 from a position adjacent chamber 21, over a division 26 between chambers 21 and 22 and down to a position adjacent to chamber 22. The magnetic beads 10 inside the housing 20 follow the movement of the magnetic element 27 outside the housing and are thus transferred to chamber 22. The required movement of the magnet 27 is made possible by attaching the magnet to a lower end of a holder 28 that slides at its upper end along a wire frame 29 that is shaped to cause the magnet to follow the required movement.

Figure 6D:
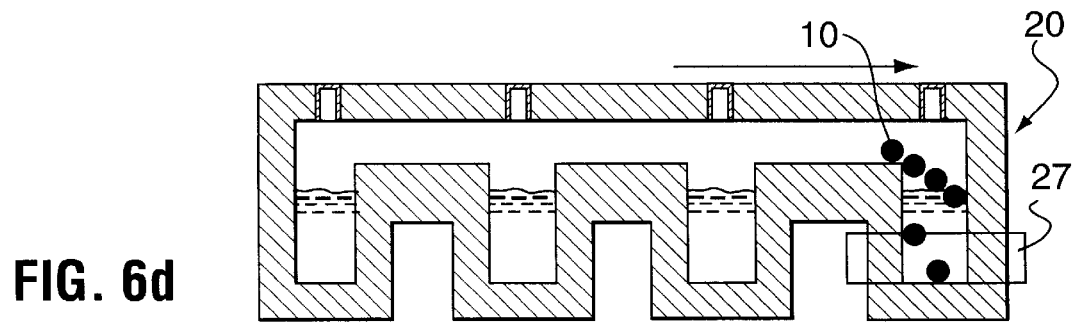

After a period of time suitable for neutralization in chamber 22, the beads may then be transferred by operation of the same magnetic into the annealing chamber 23 (see FIG. 6c), and then (after a suitable period of time) to the polymerization chamber 24 (FIG. 6d). After polymerization is complete, the beads may then be transferred by the magnet 27 directly to the denaturing chamber 21 where the cycle may be commenced again. This latter step is possible because the magnet is made to move horizontally only along the upper part of the frame 29, except when moving the beads vertically out of the polymerization chamber and into the denaturing chamber, i.e. in such a way that the beads along the upper sidewall of the container without falling into any of the intervening chambers. In this way, any number of cycles may be repeated until suitable quantities of the synthesized DNA have been amplified, at which time the beads may be removed from the housing and the attached DNA extracted.

Openings 30, 31, 32, 33 are provided in the upper wall 34 of the housing 20 and each is closed by a self-sealing pierceable diaphragm 35. Solutions may be introduced into and aspired from the chambers of the housing through such openings by piercing the diaphragm with a needle of a hypodermic syringe or other insertion device (not shown) and introducing or removing the solution. In this way, the interior of the housing 40 may be kept sterile (i.e. uncontaminated with foreign DNA or RNA). The housing 20 may be supplied to the user with the necessary reactants already present in the appropriate chambers. For example, these reactants may be provided as freeze dried powders adhering to the walls of each container. Before the start of the process, measured amounts (e.g. 25 $\mu$l portions) of sterile distilled water are added to each chamber through the sterile openings. Once this has been done, undue tilting of the holder has to be prevented in order to avoid mixing the solutions from the adjacent containers.

The housing 20 of FIGS. 6a–6d may take the form of a disposable sealed container (referred to herein as a "cassette") provided with the illustrated four chambers, i.e. it may be a self-contained unit that may be inserted into and removed from stationary base unit that has the necessary drive and heating mechanisms, etc. Each cassette 20, which may be completely removable from the stationary base unit, may be made entirely of an inexpensive thin-walled material, e.g. thin plastics, that does not shield the interior of the cassette from the magnetic field produced by the magnet 27 located outside the cassette. An ideal size for such a cassette is 3 inches by 3 inches by 5 inches.

Figure 7:
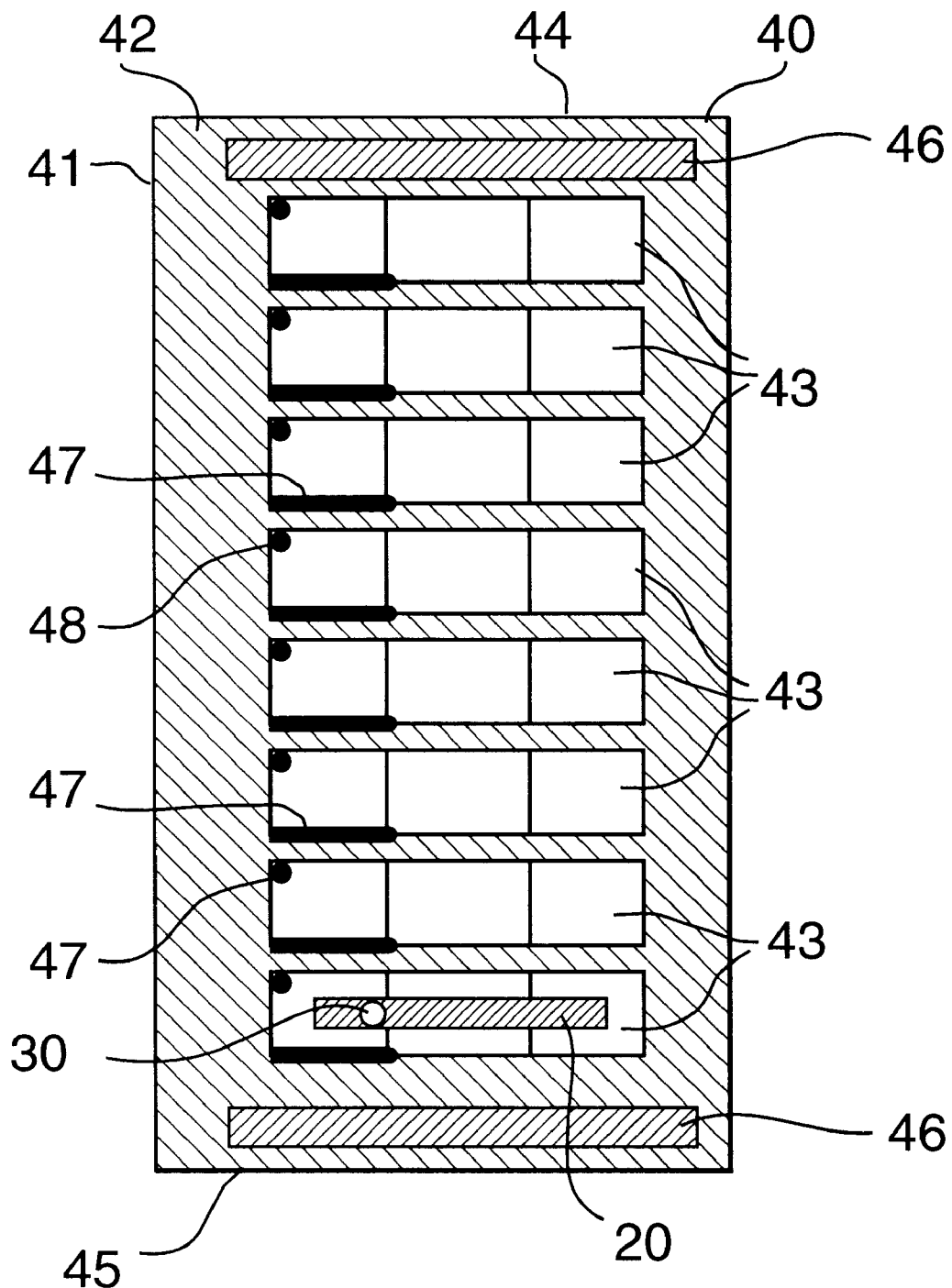
FIG. 7 is a top plan view of a holder apparatus for a number of cassettes of the type shown in FIGS. 6*a*–6*d*.

FIG. 7 is a top plan view of an embodiment of a stationary base unit 40 (acting as a holder apparatus) for the cassettes 20. The apparatus consists of a body 41 having an upper surface 42 provided with eight slots 43, each slot being dimensioned to receive a separate removable cassette 20 (one of which is shown in place in FIG. 7) of the type shown in FIGS. 6a–6d. Each end 44, 45 of the body is provided with a further slot 46 for receiving a magnet 27. A drive mechanism for the magnet (shown in FIGS. 6a–6d, but not shown in FIG. 7) moves the magnets back and forth in the slots 46 sliding on wire frames 29 (not shown in this figure, but see FIG. 6a) following the vertical and horizontal path previously illustrated. The operation of the drive mechanism may be effected manually by an operator, but is more preferably carried out automatically by means of a motor (not shown) controlled by a timer (not shown) programmed to move the magnets in such a way as to move the beads 10 from one chamber of each cassette to another after a suitable period of residence in each chamber (usually 30 seconds to 2 minutes).

If necessary for more reliable operation, each of the cassette slots 43 may be provided with a pair of adjacent magnet slots 46 to ensure that the magnetized beads in each cassette will be exposed to a strong magnetic field.

Each slot 43 may be provided with a heating element 47, positioned to lie adjacent to an appropriate chamber of a cassette 20, and a temperature sensing device 48 (e.g. a thermocouple) to measure the temperature of the an adjacent chamber of the cassette. The temperature sensing device and heater may be electronically linked to a power source (not shown) for the heater to turn the heater on or off according to predetermined temperatures sensed by the temperature sensor. For the embodiment employing denaturing by alkali, all of the chambers of all of the cassettes may be kept at the same specific temperature, although the denaturing chamber 21 is preferably heated to an elevated temperature (but below the heat-denaturing temperature) to assist denaturing of the DNA (denaturing proceeds more quickly at higher temperatures in alkali, even if the heat-denaturing temperature is not reached). For the embodiment that involves denaturing by elevated temperature (>94° C.), then the denaturing chamber 21 of each cassette will be kept at the required high temperature, but the remaining chambers will be kept at much lower temperatures, which may vary according to the particular target for amplification. Nevertheless, the temperature control for the denaturing chamber should preferably, for flexibility of use, be capable of maintaining any desired temperature likely to be required (i.e. in the range of ambient temperature to greater than 94° C.).

Figure 8:
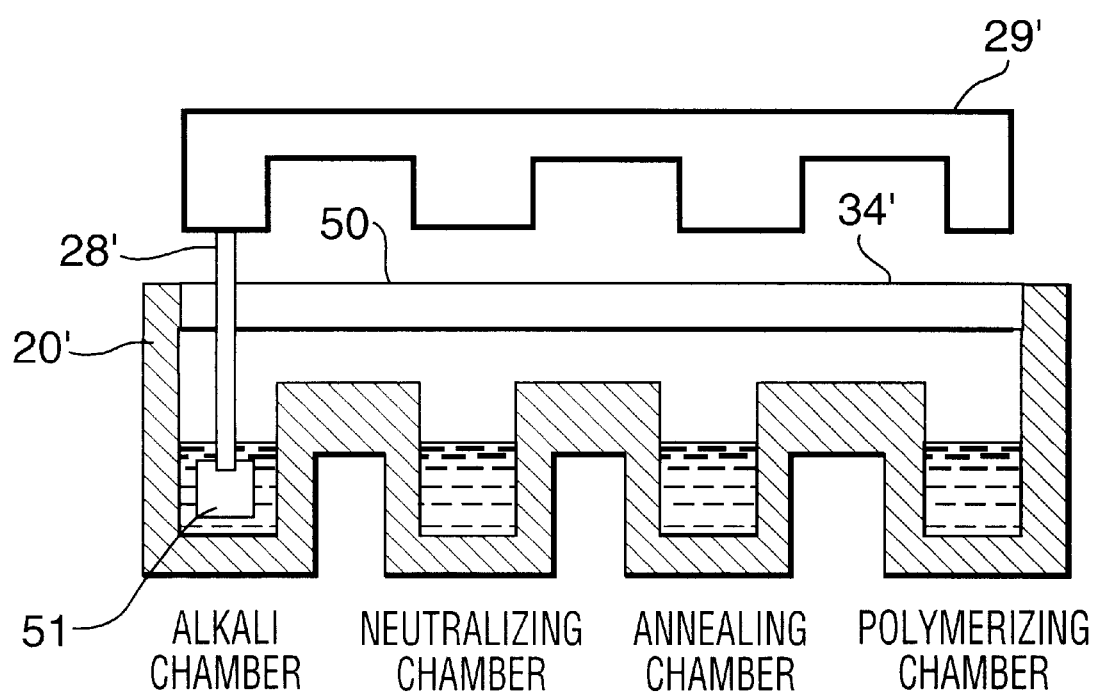
FIG. 8 is a diagrammatic representation similar to FIG. 6*a* of an apparatus which makes use of a paper-type transport medium rather than magnetic beads.

As previously noted, instead of using coated magnetic beads, the solid transport medium may be a non-magnetic solid or coated solid in the form of coated particles or sheets. The particles or sheets may then be withdrawn directly from one chamber and inserted into another by non-magnetic means. A suitable arrangement for this is shown in FIG. 8. This apparatus is similar to the apparatus of FIGS. 6a–6d, except that there is no magnet 27 and a wire frame 29' is provided directly above each cassette 20' and each cassette 20' is provided with a central longitudinal slot 50 in the upper wall 34'. The frame carries a holder 28', the bottom end of which holds a piece 51 of a paper type transport medium (e.g. nylon paper). The piece of paper 51 carries the nucleic acid and moves it from chamber to chamber as the holder 28' is driven along the frame 29'.

As previously noted, an alternative procedure may be carried out which the nucleic acid is bound to a solid anchoring support and remains stationary, and separate reagent solutions are successively and temporarily brought into contact with the bound nucleic acid. In such a case, the separate reagent solutions may be reduced to just two, for example:

A denaturing solution, containing (for example):
    a) Specific (e.g. 40 mer) oligonucleotide (e.g. 1 μM)
    b) A DNA template;
and
  a polymerization solution, containing (for example):
    a) A thermolabile polymerase (this may even be added at the beginning of the process) (preferably containing 1 unit of polymerase);
    b) A mixture of four nucleotides (dCTP, dTTP, dATP, dGTP) (preferably 200 μM of each); and
    c) $MgCl_2$ (preferably 1.0 mM–4.0 mM).

Figure 9:
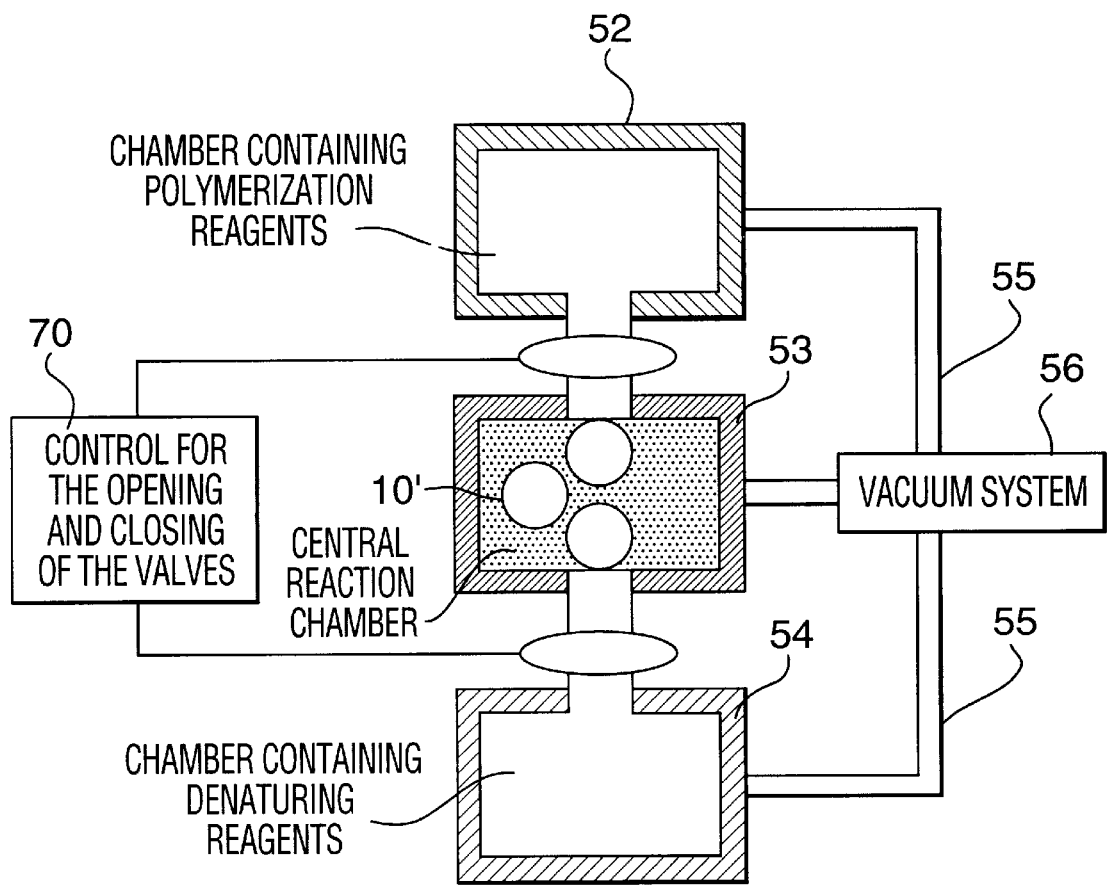
FIG. 9 is a diagrammatic representation of a further apparatus in which the nucleic acid is bound to a stationary (anchoring) medium and treatment solutions are successively brought into contact with the stationary medium.

The procedure may be carried out in an apparatus of the type shown in FIG. 9 having three separate containers 52, 53, 54. Containers 52 and 54 hold solutions of the type indicated above and container 53 contains a support and anchoring medium for nucleic acid. In the illustrated embodiment, the support and anchoring medium comprises large beads 10', but could alternatively be a coated interior surface of the chamber 53 itself. To bring about the required reaction, the sample DNA is introduced into chamber 53 and binds to the anchoring and support medium. Solutions from chambers 52 and 54 are in turn transferred into and subsequently removed from the central chamber 53 by aspiration via tubing 55 connected to a vacuum system 56. As the solutions are introduced into chamber 53 from the two adjacent chambers 52 and 54, appropriate conditions are applied (e.g. elevated temperature) and the solutions are allowed to remain in the chamber 53 for a time appropriate for the desired reaction.

The sequences amplified by the methods of the invention may be detected in any suitable way, as will be readily apparent to persons skilled in the art. Suitable techniques are disclosed, for example, in "Molecular Cloning—A Laboratory Manual" by J. Sambrook, E. F. Fristsch and T. Maniatis, CHL Press, New York (the disclosure of which is incorporated herein by reference).

For example, 25 μl of solution from the denaturing zone may be aspirated into an Eppendorf tube as a sample PCR reaction mixture. The PCR reaction mixture may be cleaned up using a chromatography column (e.g. a G50 Sephadex™ column—obtainable from Pharmacia Fine Chemicals, Sweden) and then treated further depending upon the type of labelling employed.

The invention is illustrated in more detail by outlining steps of a preferred embodiment of the process of the invention as it may be carried out in practice.

EXAMPLE 1

Identification of microbes may be carried out by different methodologies. This includes isolation of microbes by culturing, or detecting any specific gene products (proteins) by immunological methods (ELISA). With the discovery of Taq polymerase, the polymerase chain reaction (PCR) is substituting for the conventional identification methodologies. PCR technology is quicker, with higher specificity and sensitivity. The main advantage of PCR is that within a matter of 60 minutes the main component of the cell nucleic acid can be multiplied to an extent that will take more than 18 hrs to achieve by culturing. Such identification involves three steps. These are:
  a) Preparation of DNA from the sample (clinical or environmental).
  b) Amplification of DNA by PCR.
  c) Detection of amplified DNA.

Preparation of DNA (Using Bacterial Cells as an Example)
1. The suspension of bacterial cells is centrifuged at 5,000 rpm in a microfuge and the supernatant thrown away.
2. The pellet is resuspended in 100 μl of TE buffer at pH 7.0 and step (1) repeated.
3. To the resuspended cell pellet a mixture (200 μl) of 0.2N NaOH and 1% SDS is added, mixed and left on ice/15 minutes.
4. To the above mixture add 150 μl of 3M potassium acetate and invert three times and leave it on ice.
5. The mixture is microfuged at 10,000 rpm and the suspension is transferred to a new tube and 500 μl of saturated phenol is added and mixed for 3 minutes.
6. The mixture is centrifuged at 10,000 rpm for 5 minutes and the upper layer is transferred to a new Eppendorf® tube.
7. 500 μl of chloroform is added, mixed and centrifuged at 10,000 rpm for 5 minutes.
8. The upper aqueous layer is transferred to a new Eppendorf® tube and 350 μl of isopropanol is added, mixed and left for 15 minutes.
9. The mixture is microfuged at 15,000 rpm for 15 minutes, the supernatant is removed and the DNA pellet is dried in a speed vac.

Isothermal Amplification

1. The isolated genomic DNA is bound to Hy-bond® nylon paper.
2. The DNA bound nylon paper is attached to a frame which is moved by robotic arm. This conveyor belt has a metal strip. The conveyor belt is made to move by movement of a magnet held external to the containers (FIG. 3).
3. When the DNA bound nylon goes through the alkali container (pH 12.0) the hydrogen bonds between the DNA strands are broken and the bases on each are exposed.
4. Movement of the conveyor belt takes the nylon paper to the neutralizing container where it is washed by 2×SSC (3M Sodium chloride and 0.3M Sodium citrate solution at pH 7.0) still maintaining the denatured state of the DNA strands. During this phase the nylon paper is returned to neutral pH 7.0.
5. From here the nylon paper is moved to the annealing container where the ionic concentration is dropped such that only specific primers with highly complementary primers will anneal. The high stringency will prevent any nonspecific primers binding or annealing to the exposed strands.
6. The nylon paper moves to the last container where with the help of polymerase, magnesium chloride, dNTP's and polymerase buffer, polymerization takes place.
7. The cycle is repeated by the nylon paper moving to the first container which is the denaturing container. The new DNA strands formed will then bind to the nylon paper.
8. At the end of certain number of cycles (approximately 30) there will be an adequate amount of DNA on the nylon paper and/or in the denaturing chamber.
9. This can be now detected by dot blot using an antibody labeled probe or eluted to carry out further analysis such as sequencing and cloning.

EXAMPLE 2

Two-Chambered Heat Denaturation Procedure The Identification of Target DNA

An apparatus of the type shown in FIGS. 6a–6d, except containing only two chambers (a denaturing chamber and a polymerization chamber), is provided. A drive frame suitable for two chambers is also provided for moving a magnet between the chambers. The denaturing chamber contains freeze dried material consisting of the following:

a) Magnetic beads with specific (40 mer) oligonucleotides (1 $\mu$M); and
b) Specific labeled primers (the labeling may be via radioactive biotin, antibody or fluorescent dye) (1 $\mu$M).

The polymerization chamber contains a freeze dried material consisting of the following:

a) A thermolabile polymerase (although this may be introduced at the start of the process, if desired) (1 unit);
b) A mixture of four nucleotides dCTP, dTTP, dATP and dGTP (200 $\mu$M of each); and
c) $MgCl_2$ (1.0 mM–4.0 mM).

As a first step, 25 $\mu$l of nuclease-free water is added to the polymerization chamber to cause the contents to dissolve, and a DNA sample in 25 $\mu$l of nuclease-free water is added directly into the denaturing chamber. The denaturing chamber is heated to a temperature greater than 94° C. This causes the double stranded DNA to separate into single strands.

In the next step, the temperature in the denaturing chamber is reduced to a specific annealing temperature for a suitable time (30 seconds to 1 minute). This oligomers attached to the magnetic particles anneal to the corresponding strand of the DNA. Because initially there are few copies (usually less than 10) of the target DNA strands, only a few of the magnetic beads will carry a duplex of single stranded DNA and a labeled primer.

The magnet is moved along the drive frame to cause the beads, i.e. both those which carry the oligomer primers and single stranded DNA and those which carry only the oligomer primers, to exit the denaturing chamber and enter the polymerization chamber. The oligomer primer primes the polymerization reaction in the presence of the dNTP, $MgCl_2$ and the polymerase enzyme. Polymerization thus takes place.

The magnet on the drive frame is then moved back to the starting position so that the beads exit the polymerization chamber and re-enter the denaturing chamber. The temperature of this chamber is again increased to above 94° C. for a period of 30 seconds to 1 minute, and then the temperature is decreased to the specific annealing temperature. The double stranded DNA carried on the magnetic beads separates into the original single DNA strands and an extended complementary single stranded DNA, still held on a few magnetic beads. The original DNA strands will bind to new magnetic beads carrying labeled oligomer. Labeled oligomer present in the denaturing chamber binds to the 3' end of the extended complementary single stranded DNA on the magnetic beads. Although original single stranded DNA could bind to the magnetic beads carrying extended single stranded DNA, the high concentration of labeled oligomer will overwhelm the low concentration (low number of copies) of the original target DNA.

The indicated cycle is repeated 25 to 40 times and the process is finally stopped with the beads in the polymerization chamber. The contents of the polymerization chamber are aspirated into a new 200 $\mu$l eppendorf tube, washed with low ionic buffer and detected according to the nature of the labeling, i.e.:

Radio isotope X-ray film

Antibody labeling ELISA

Fluorescence Fluorescence detection.

Various modifications may be made to this process. Firstly, instead of using only one type of magnetic bead carrying an oligomer specific to only one of the template DNA strands, two types of beads may be provided, one specific to the sense strand and one specific to the anti-sense strand. This may speed up the amplification and allow a reduction in the number of the cycles.

Secondly, the oligomer attached to the magnetic bead itself may be labeled and also carry an unlabeled 3' binding primer.

EXAMPLE 3

Two Chamber Heat Denaturation Procedure Synthesis of Single Stranded DNA Templates of a Target DNA for Sequencing An apparatus of the type shown in FIGS. 3a–3d, except containing only two chambers (a denaturing chamber and a polymerization chamber), is provided. A drive frame suitable for two chambers is also provided for moving a magnet between the chambers. The denaturing chamber contains freeze dried material consisting of the following:

a) Magnetic beads with a specific (40 mer) oligonucleotide (1 $\mu$M).

The polymerization chamber contains a freeze dried material consisting of the following:

a) A thermolabile polymerase (although this may be introduced at the start of the process, if desired) (1 unit);

b) A mixture of four nucleotides dCTP, dTTP, dATP and dGTP (200 μM of each); and c) MgCl$_2$ (1.0 mM–4.0 mM).

In a first step, 25 μl of nuclease-free water is added to the polymerization chamber to dissolve the contents. A DNA sample in 25 μl of nuclease-free water is introduced directly into the denaturing chamber. The contents of the denaturing chamber are heated to a temperature above 94° C. and the double strands separate into single strands.

As a next step (which is eliminated after about 10 cycles), the temperature is lowered to a specific annealing temperature for 30 seconds to 1 minute. The magnetic particles provided with the oligomer anneal to the corresponding single strand of the DNA. Because initially there will be few copies (normally less than 10) of the target single stranded DNA, only a few of the magnetic beads provided with the oligomer will carry a single stranded DNA molecule as a duplex.

The magnet on the drive frame is then moved so that the magnetic beads, i.e. both those carrying the duplex and those carrying only the oligomer, are moved to the polymerization chamber where the oligomer acts as a primer and, in the presence of the DNTP, MgCl$_2$ and polymerase enzyme, causes polymerization to take place.

The magnet is then moved to the starting position so that the beads re-enter the denaturing chamber, where the temperature is increased above 94° C. for 30 seconds to 1 minute. The temperature is then decreased to the specific annealing temperature (as noted above, after about 10 cycles this step is eliminated). The DNA strands on the magnetic beads carrying polymerized DNA separate into the original single stranded DNA copy and an extended complementary single stranded DNA on a few of the magnetic beads. After the initial 10 cycles or so, there will no longer be any new magnetic beads carrying available oligomers, so that these single stranded DNA will be left as unbound strands.

The cycle is repeated 25 to 40 times and the process is finally stopped with the beads positioned in the polymerization chamber. The contents of the denaturing chamber are aspirated while it is at 94° C. and is thus ready for sequencing.

The extended DNA sequence attached to the magnetic beads will act as a template for new priming and hence at the end of each cycle at the denaturation step the newly synthesized DNA will be separated from the magnetic bead and left in the chamber (asymmetric amplification). The number of beads should be such that it will be able to shorted the time of amplification and that adequate copies of the newly synthesized DNA strand with the labeled primers will accumulate for detection.

This procedure may be modified in the following ways.

Firstly, the contents of the polymerization chamber may be altered slightly so that, in addition to the ingredients mentioned above, it will also contain one of the dedioxy nucleotides (e.g. ddTTP). At the end of the process, the contents of the denaturing chamber will include single stranded copies of the template exhibiting termination with ddTTP. This will be adequate to allow analysis of a single nucleotide tract sequence.

Secondly, if a full nucleotide sequence is required, the procedure may be carried out using four cassettes each carrying one of ddTTP, ddCTP, ddATP and ddGTP.

EXAMPLE 4

Detection of Amplified Sequence

This Example illustrates how amplified sequences may be extracted and detected following the reactions of the present invention. The following steps are carried following PCR in a cassette of the type shown in FIGS. 6a–6d.

1. The cover above the denaturing chamber is removed and 25 μl of the reaction mixture is aspirated into an Eppendorf tube.

2. The PCR reaction mixture is cleaned up using a G50 Sphadex™ column (Pharmacia, Fine Chemicals, Sweden).

3. Depending on the type of labelling:

a) For radio labeled probes, the mixture is placed on a nylon paper and autoradiographed for signals.

b) For fluorescence probes, the mixture is diluted in suitable diluents and read on a fluorescence scanner (Hitachi FMBIO II).

c) For biotinylated probes, the mixture is placed on a nylon paper. This is followed by addition of strepavidin conjugated antibody which is followed by species specific antibody conjugated with alkaline phosphatase or horse radish peroxidase.

Detection with Biotinylated Primers

1. The nylon filter is transferred from the final wash in SSC to a tray containing 200 ml of 150 mM NaCl, 50 mM Tris.Cl(pH 7.5). The filters are incubated for 10 minutes at room temperature with gentle agitation.

2. The filter is transferred to a heat sealable plastic bag or to a shallow tray, containing 0.1 ml of phosphate free, azide-free blocking solution per square centimeter of filter.

3. An enzyme-coupled secondary reagent is added according to the manufacturer's instructions and the bag (if used) is sealed. Usually it is recommended that the secondary reagent be diluted 1:200 to 1:2000 to yield a final concentration of 0.5–5.0 μg/ml.

4. The filter is incubated with an enzyme-coupled secondary reagent for 1 hour at room temperature with gentle agitation. The filter is transferred to a tray containing 200 ml of 150 mM NaCl, 50 mM Tris.Cl(pH 7.5). The filter is incubated for 10 minutes at room temperature with gentle agitation. This step is repeated three more times using fresh NaCl/Tris.Cl solution each time. Add appropriate chromogenic substrates to the filter.

Chromogenic Substances

1. NBT (nitro blue tetrazolium) is prepared. The substrate 5-bromo-4-chloro-3-indolyl phosphate/nitro blue tetrazolium (BCIP/NBT) is converted in situ into a dense blue compound by immuno localised alkaline phosphatase. 0.5 g of NBT is dissolved in 10 ml of 70% dimethylformamide.

2. BCIP (Bromo chloro-indo)-phosphate is prepared. 0.5 g of BCIP disodium salt is dissolved in 10 ml of 100% dimethylformamide.

3. Alkaline phosphatase buffer.

4. 66 μl of NBT stock is mixed with 10 ml of alkaline phosphatase buffer. The mixture is mixed well and 33 μl of BCIP stock is added. This chromogenic substrate mixture should be used within 30 minutes.

5. Washed nylon filter is transferred to a shallow tray. 0.1 ml of chromogenic substrate mixture per square centimeter of filter is added. The filter is incubated at room temperature with gentle agitation.

6. The progress of the reaction is monitored carefully. When the bands are of the desired intensity, the filter is transferred to a tray containing 200 µl of 0.5 M EDTA (pH 8.0) and 50 ml of phosphate buffered saline. The filter is photographed to provide a permanent record.

Alternatively horse radish peroxidase may be used with 3,3'-diaminobenzidine, which is converted to a brown precipitate.

Antibodies coupled to HRP (Horse radish peroxidase) or Ap (Alkaline phosphatase) that react with species-specific determinants on primary antibodies are available from commercial source (Sigma Chemicals, USA) Avidin-conjugated HRP are available from commercial sources as well as biotinylated primers (Pierce, USA).

The single stranded DNA may be used as a template for DNA sequencing. This approach may be adopted to an application which involves detecting point mutations for cancer susceptibility.

While the invention and embodiments thereof have been described in detail above, it will be apparent that various modifications and alterations will be possible without departing from the spirit and scope of the invention. All such variations and modifications are included within the scope of the present application.

What we claim is:

1. Apparatus for amplifying a nucleic acid sequence by a process involving a polymerase or ligase chain reaction, which process comprises repeated cycles of steps including a nucleic acid denaturing step and a nucleic acid synthesis step, said synthesis step being carried out under action of an enzyme, wherein the denaturing step and the synthesis step are carried out in different denaturing and synthesis reaction zones, respectively, and wherein, during said repeated cycles, the enzyme is maintained in isolation from the denaturing reaction zone, and conditions or reagents required for the denaturing step are maintained in isolation from the synthesis reaction zone to the extent that said reactions and conditions do not impede said synthesis reaction substantially; said apparatus comprising a first container defining said denaturing zone for holding reactants required during said denaturing step, a second container defining said synthesis reaction zone for holding reactants required during said synthesis step, including said enzyme, a first and second containers being physically separate entities, a movable solid phase support for binding nucleic acid formed during said synthesis step, and means for repeatedly moving said solid phase support from said first container to said second container and then back to said first container for a plurality of cycles until said amplifying of said nucleic acid sequence is complete, while avoiding transfer of substantial amounts of reactants between said first and second containers.

2. Apparatus according to claim 1, wherein said means comprises a drive mechanism for transporting said solid phase support successively between said containers.

3. Apparatus according to claim 2, wherein said solid phase support is magnetic, and wherein said drive mechanism includes a magnet for attracting said solid phase support and means for moving said magnet to cause said solid phase support to move between said containers.

4. Apparatus according to claim 2, wherein said solid phase support is in the form of a sheet of material, and wherein said drive mechanism includes an attachment for holding said sheet and means for moving said attachment to cause said sheet to move from between said containers.

5. Apparatus according to claim 1, including a holder, and at least one removable cassette unit removably held by said holder, said cassette incorporating said containers.

6. Apparatus for carrying out a process of amplifying a nucleic acid sequence, involving repeated cycles of the steps of denaturing of complementary strands of nucleic acid, annealing of said nucleic acid with at least one complementary primer flanking a target sequence, and nucleic acid polymerase catalyzed polymerization of a sequence of nucleic acid complementary to said target sequence extending from said primer(s) using the target sequence as a template for polymerization, said apparatus comprising:

a plurality of containers, each being physically separate entities, for containing liquids forming reaction zones for denaturing, annealing and polymerization of nucleic acids, a solid support for immobilizing said nucleic acid and synthesized nucleic acid, and means for moving said solid support from one of said containers to another in a sequence appropriate for effecting a polymerase chain reaction, wherein at least a container provided for said synthesis step is provided with a heater controlled to prevent liquids in said container from reaching a temperature at which activity of thermolabile DNA polymerase held in said container is destroyed.

7. A cassette unit for carrying out a process involving amplifying a nucleic acid sequence by a polymerase or ligase chain reaction, said process involving repeated cycles of steps including a nucleic acid denaturing step and a nucleic acid synthesis step, said synthesis step being carried out under action of an enzyme, wherein the denaturing step and the synthesis step are carried out in different denaturing and synthesis reaction zones, respectively, and wherein, during said repeated cycles, the enzyme is maintained in isolation from the denaturing reaction zone, and conditions or reagents required for the denaturing step are maintained in isolation from the synthesis reaction zone to the extent that said reactions and conditions do not impede said synthesis reaction substantially; said cassette unit comprising an enclosed housing having at least two internal chambers, that are physically separate entities, for holding liquid reactants and maintaining said liquid reactants separate from each other and a solid support for nucleic acid provided in one said container, said housing including at least one passage allowing said solid support to be brought successively and temporarily into contact with said liquid reactants from said at least two containers.

8. A cassette unit according to claim 7, wherein said solid support comprises beads that may be moved through said passage between said at least two containers.

9. A cassette unit according to claim 7, wherein said housing has an upper wall provided with at least one opening covered by a self-sealing pierceable diaphragm.

* * * * *